United States Patent [19]

Fulton

[11] 4,284,288
[45] Aug. 18, 1981

[54] FOLDING BICYCLE STRUCTURE

[76] Inventor: Roger G. Fulton, 3731 Garner, Kansas City, Mo. 64123

[21] Appl. No.: 78,433

[22] Filed: Sep. 24, 1979

[51] Int. Cl.³ .............................................. B62K 15/00
[52] U.S. Cl. ..................................... 280/278; 280/287
[58] Field of Search ............... 280/278, 287, 276, 279, 280/280, 283

[56] References Cited

U.S. PATENT DOCUMENTS

| | | | |
|---|---|---|---|
| 378,253 | 2/1888 | Latta | 280/278 |
| 599,016 | 2/1898 | Ryan | 280/278 |
| 1,584,314 | 5/1926 | Mamiya | 280/278 |
| 1,584,568 | 5/1926 | Clark | 280/278 |
| 2,372,024 | 3/1945 | Schwinn | 280/278 |
| 2,777,711 | 1/1957 | Yokomaki | 280/278 |
| 3,015,498 | 1/1962 | Tanaka et al. | 280/278 |
| 3,259,399 | 7/1966 | Silbereiset al. | 280/278 |
| 3,294,416 | 12/1966 | Carnielli | 280/278 |
| 3,374,009 | 3/1968 | Jeunet | 280/278 |
| 3,623,749 | 11/1971 | Jensen | 280/278 |
| 3,865,403 | 2/1975 | Majerus | 280/287 |
| 3,979,136 | 9/1976 | Lassiere | 280/278 |
| 3,990,717 | 11/1976 | Best | 280/278 |
| 3,993,322 | 11/1976 | Tijen | 280/278 |
| 4,067,589 | 1/1978 | Hon | 280/278 |
| 4,111,447 | 9/1978 | Ishida | 280/278 |

FOREIGN PATENT DOCUMENTS 971910  1/1951  France ..................................... 280/287
2225328 11/1974 France ..................................... 280/287

*Primary Examiner*—Joseph F. Peters, Jr.
*Assistant Examiner*—Randall A. Schrecengost
*Attorney, Agent, or Firm*—Fishburn, Gold and Litman

[57] ABSTRACT

A portable folding bicycle for compact storage in a folded position utilizes a main frame having front and rear frame sections supporting front and rear wheels and hinged together for folding and positioning the wheels into compact side-by-side relationship. A seat structure is removably attached to the rear frame section and power transmission members such as crank assemblies, sprockets and a drive chain extend between the rear frame section and the rear wheel for causing powered rotation. The front frame section has at least one frame member defining a receptacle for receipt of the front wheel upon folding, and a steering assembly affixed thereto and including upper and lower end portions. A front fork assembly is foldably mounted to the steering assembly and has at least one fork member rotatably supporting the front wheel and a connecting hinge attaching the front fork member to the lower end portion of the steering assembly for rearward and upward folding of the front fork member and the front wheel whereby the front wheel is received into the receptacle for compact storage when the bicycle is folded. A handle bar assembly is connected to the front fork member and is collapsible relative thereto.

10 Claims, 6 Drawing Figures

FOLDING BICYCLE STRUCTURE

This invention relates to bicycles and particularly to such bicycles that are folding and collapsible for compact storage thereof and ease of transportation when the bicycle is not in use.

Bicycles are an increasingly important form of personal transportation as shown by the increasing numbers of bicycles sold each year in the United States. The majority of bicycles sold can be considered children's playthings while a very small percentage are for the serious cross-country rider and have a plurality of gear ratios or speeds, such as ten or fifteen speeds. An intermediate number of bicycles are suitable for everyday transportation, particularly in urban and suburban areas where studies have shown that the typical automobile trip is less than five miles, carries less than two persons and travels at an average speed of fifteen miles per hour. In this environment, a bicycle is very suitable transportation, provides exercise and does not expend combustible fuels. A recurring problem, and one confronted by many previous inventors, is the difficulty of storing a bicycle suitable for everyday transportation when the bicycle is not in use whereby the bicycle fits in city buses, crowded apartments, dormitory rooms, offices and the like.

Collapsible and folding bicycles are known in the art and variously employ foldable elements singly or in combination such as handlebars, pedals, and main frames and often use relatively small wheels to reduce the folded dimensions. Such folded bicycles often lack rigidity and the joints thereof tend to weaken and loosen with use, thereby rendering the bicycle unsteady at best and quite possibly unsafe. Moreover, prior designs for folding bicycles do not realize the potential reductions in folded dimensions together with retention of rigidity possible by the use of the present invention.

The principal objects of the present invention are: to provide a folding bicycle structure which folds into a compact, easy to carry and store relationship; to provide such a bicycle having a main frame foldable into front and rear sections and which are connected by hinge structure providing a rigid joint when the sections are not folded; to provide such a bicycle in which projecting members thereof, such as the pedals and handlebars are foldable and collapsible for compact storage; to provide such a bicycle having a front frame section with frame members defining a receptacle for receipt of a front wheel foldable thereinto; to provide such a bicycle having a foldable front wheel which rotates rearwardly and upwardly into the receptacle for compact storage thereof; and to provide such a bicycle which is relatively inexpensive, highly reliable in use, light weight in design and construction and well adapted for its intended purpose.

Other objects and advantages of this invention will become apparent from the following description taken in connection with the accompanying drawings wherein is set forth by way of illustration and example, a certain embodiment of this invention.

FIG. 2 is a perspective view of the bicycle structure showing same partially folded.

FIG. 3 is a perspective view showing the bicycle structure in a completely folded relationship for compact storage.

FIG. 4 is a fragmentary elevational view showing a front wheel folded and received into a receptacle formed by the front frame section.

FIG. 5 is a fragmentary elevational view of a folding crank arm structure employed by the bicycle.

FIG. 6 is a fragmentary elevational view of a folding front fork structure of the bicycle.

Figure 1:
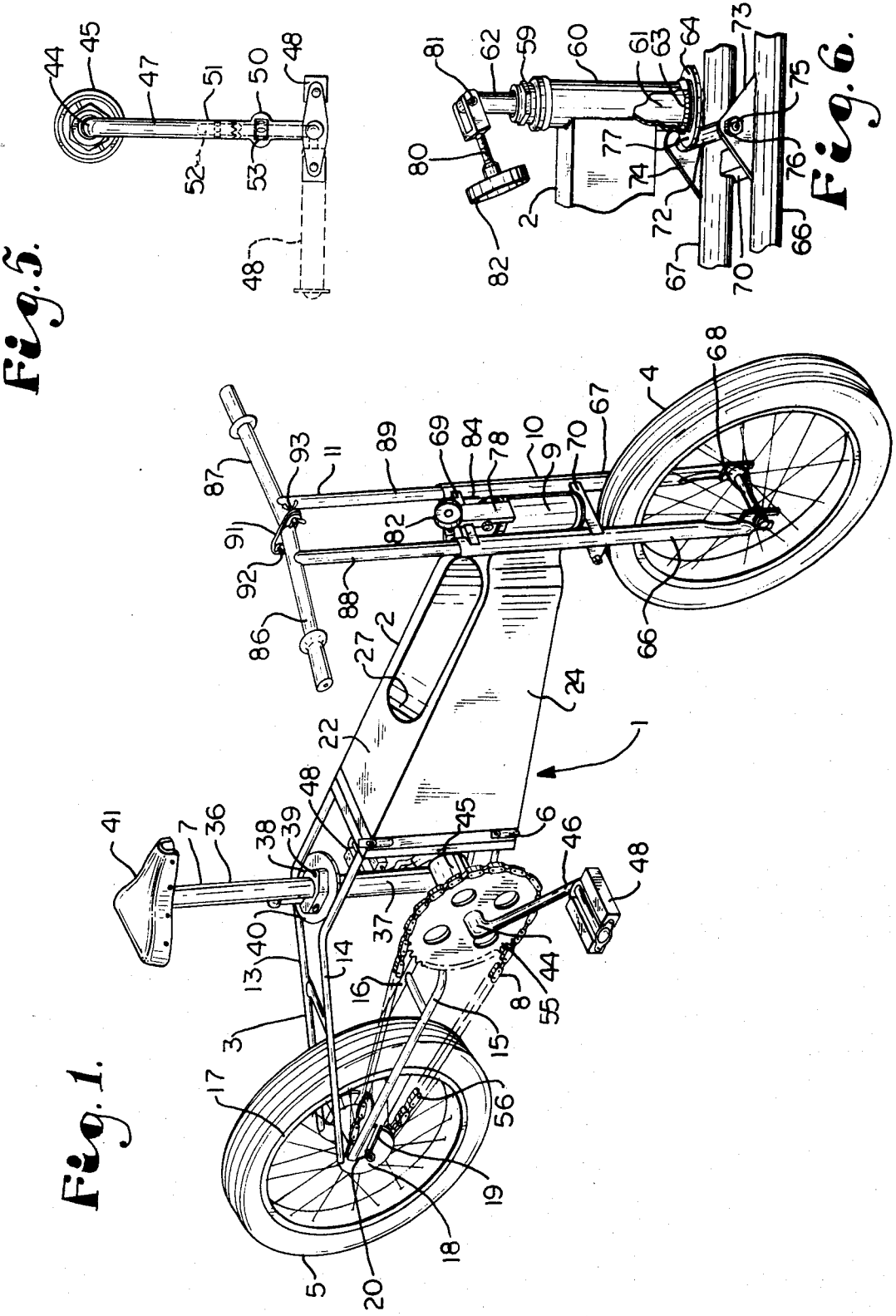
FIG. 1 is a perspective view of a folding bicycle structure embodying this invention and shown in a use or unfolded relationship.

As required, a detailed embodiment of the present invention is disclosed herein, however, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring more in detail to the drawings:

The reference numeral 1 generally indicates a folding bicycle structure embodying the present invention and having front and rear frame sections 2 and 3 respectively supporting front and rear wheels 4 and 5 and having a hinge means 6 interconnecting the frame sections 2 and 3 for folding relative to each other and positioning the frame sections 2 and 3 and wheels 4 and 5 into a compact, side-by-side relationship.

A removable seat structure 7 is attached to the rear frame section 3 as well as a power transmission means 8 for causing rotation of the rear wheel 5.

A front frame section 2 has at least one frame member defining a receptacle for receipt of the front wheel 4 when the bicycle structure 1 is folded. The front frame section 2 has a steering assembly 9 affixed thereto and including upper and lower end portions. A front fork assembly 10 is foldably mounted to the steering assembly 9 and has at least one fork member rotatably supporting the front wheel 4 and a connecting hinge means attaching the front fork member to the lower end portion of the steering assembly for rearward and upward folding of the front fork member whereby the front wheel 4 fits into the receptacle for compact storage.

Further providing a compact storage arrangement is a handlebar assembly 11 connected to the front fork member and collapsible relative thereto.

The front and rear frame sections 2 and 3 provide rigid structural support for mounting the front and rear wheels 4 and 5, supporting a rider and for mounting steering means and the power transmission means 8 thereto. In the illustrated example, the rear frame section 3 includes upper spaced frame members 13 and 14 and lower spaced frame members 15 and 16 converging at a rearward portion to form a rear fork 17 having enlarged remote ends 18 with slots 19 therein to receive a wheel axle 20 therebetween. The axle 20 is fastened to the remote ends 18 for removal and repair of the wheel 5 as necessary, as by fasteners such as nuts or the like.

A front portion of the front frame section 2 supports the front wheel 4 and has the steering assembly 9, front fork assembly 10 and handlebar assembly 11 mounted thereon. In the illustrated example, the front frame section 2 is of unitary construction such as of heavy gauge sheet metal, aluminum extrusion or the like and has a single frame member with a rear portion 22 and a front portion 23 which is connected to the steering assembly 9 and with opposite side portions 24 and 25 spaced and defining a receptacle 27 for receipt of the front wheel 4.

The front frame section 2 has a hinge means rigidly connecting the front frame section 2 to the rear frame section 3 and in the illustrated example, the hinge means 6 includes upper and lower ears 28 extending from the rear frame section 3 and pivotally joined to sleeves 29 on the front frame section 2 as by pins 30. The hinge means 6 is positioned at one side of the front and rear frame sections 2 and 3 and a closure means is positioned oppositely from the hinge means 6 and in the illustrated example, FIG. 4, includes a U-shaped bracket 32 affixed to a frame member 33 and having spaced slot ends engageable with spaced, horizontal lugs 34 extending outwardly of an end member of the front frame section 2. The bracket 32 is extendibly affixed to the frame member 33 by a screw member 34' whereby the bracket 32, once engaged with the lugs 34, can be tightened to bring the front frame section 2 and the rear frame section 3 together in secure, wobblefree relationship thereby forming a rigid frame having the front and rear sections 2 and 3 for the for the bicycle structure 1.

Facilitating the tight, wobblefree relationship is the extent of the joining surfaces and, in the illustrated example, the front and rear frame sections 2 and 3 at the position of the hinge means 6 have considerable vertical and sideward breadth so as to present a broad face for the joint connection which tends to inhibit relative movement between the frame sections 2 and 3 when secured together in a use configuration, FIG. 1.

In the illustrated example, the seat structure 7 and the power transmission means 8 are mounted on the rear frame section 3. The seat structure 7 is preferably movable or collapsible relative to the rear frame section 3 such as by an upper post 36 telescopically receivable in a lower post 37 which is contained within the frame members of the rear frame section 3 and affixed thereto, such as by welding. A compressible split clamp 38 fits around the upper post 36 and secures the upper post 36 in position relative to the lower post 37 by clamping therearound and providing a stop against downward telescopic movement. Additionally, the clamp 38 has a pin 39 receivable into a matching aperture (not shown) in a lower post flange portion 40 extending between and connected to frame members of the rear frame section 3 whereby, when the clamp 38 is tightened around the upper post 36, the upper post 36 is maintained in fixed relative rotational position to the upper post 37. A lever arm 38' is swingably affixed to the clamp 38 and has a lower end cam portion bearing against the flange portion 40 for levering the clamp 38 and upper post 36 upwardly to remove the upper post 36 from the lower post 37. A saddle or seat 41 is mounted atop the upper post 36 as by conventional means.

In the illustrated example, the power transmission means for driving the rear wheel 5 is mounted to the rear frame section 3 and includes a crank assembly 44 extending through a tubular bearing member or crank hanger 45 and having opposite crank arms 46 and 47 extending therefrom. The crank hanger 45 is secured to lower members of the rear frame section 3, as by welding or the like and the crank arms 46 and 47 project outwardly on opposite sides of the bicycle structure 1. Pedals 48 are secured to free ends of the respective crank arms 46 and 47. In the illustrated example, the pedal 48 is swingably connected to the crank arm 47 by pivotal means 50 such as a split shaft 51 having joined ends provided with teeth for mutual and interlocking engagement. A screw threaded shaft 52 extends from both portions of the split shaft 51 and is tightenable by means of a rotatable knov 53 situated in one of the portions of the split shaft 51. Tightening of the rotatable knob 53 causes the portions of the split shaft 51 to draw together and interlock the teeth thereof so as to maintain the pedal 48 aligned with the axis of rotation of the crank assembly 44. Conversely, loosening of the rotatable knob 53 permits the portions of the split shaft 51 to be pulled apart whereby the teeth disengage and allow the remote shaft portion, with the pedal 48 affixed thereto, to be rotated relative to the remaining split shaft portion for storage purposes, described below.

Figures 2, 3, 4:
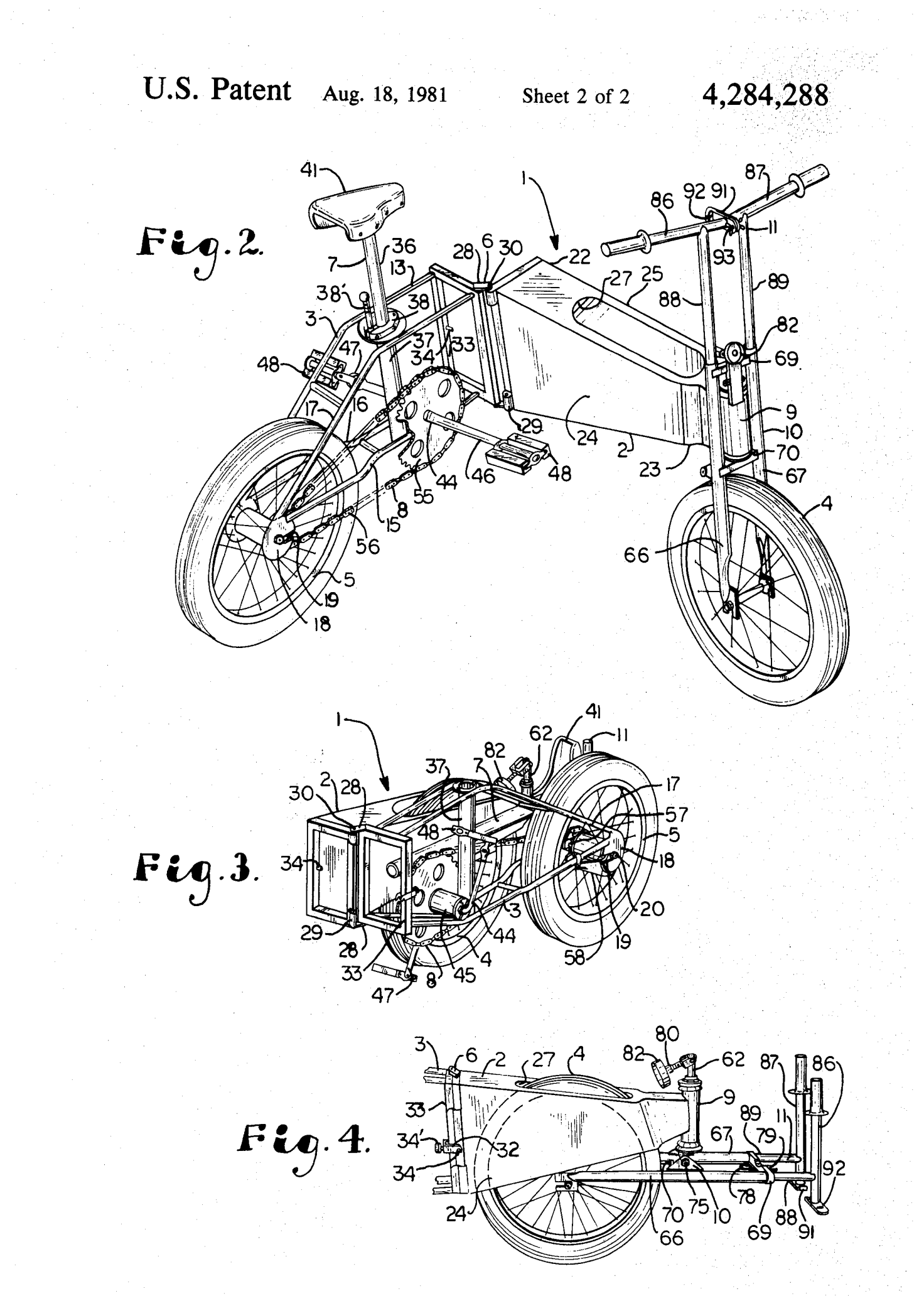

The crank assembly 44, adjacent the crank arm 46 extends through a first sprocket 55 which drives a chain 56 in a conventional manner, and which is in turn engaged with a second sprocket 57 coaxially mounted with the rear wheel spindle 20, FIG. 3. As is conventional, rotation of the crank assembly 44, as by foot power, causes the drive shaft 56 to transmit rotative power to the rear wheel 5. Conversely, backward rotation of the crank assembly 44 causes the chain 56 to move in the appropriate and opposite direction and actuate a coaster brake 58 coaxially mounted on the rear wheel axle 23.

The steering assembly 9 is affixed to a front end portion of the front frame section 2, as by welding or the like and includes an upright head or housing 60 having a generally downward directed bore therethrough and having a spindle 61 extending therethrough and with upper and lower ends 62 and 63. The steering spindle 61 is affixed in the housing 60 as by nuts 59 and is preferably bearing mounted to facilitate ease of rotation and smooth steering. The spindle lower end 63 is secured to a flange member 64 which rotates therewith.

A front fork assembly 10 having at least one arm such as a fork member is hingedly mounted to the steering spindle 61 for rearward and upward folding movement of the front wheel 4 and in the illustrated example, includes spaced fork members 66 and 67 having remote ends attached to an axle 68 of the front wheel 4 and permitting rotation thereof. The fork members 66 and 67 have upper and lower cross braces 69 and 70 that extend between the fork members 66 and 67 and provide rigidity therefor. A bearing sleeve hanger 72 such as of tubular construction is affixed, as by welding or the like, to the rear portion 77 of the flange member 64 and is rotatable with the spindle 61 for steering. Ears 73 and 74 protrude from intermediate portions of the respective fork members 66 and 67 and are pivotally connected to the bearing hanger 72 as by a pin 75 and secured at opposite ends by nuts 76 or the like.

Means are provided for detachably connecting upper portions of the fork members 66 and 67 to the spindle upper end 62 and in the illustrated example, an arm 78 is secured to the upper cross brace 69 and has a forked end portion 79, FIG. 4. A threaded shaft 80 is swingably mounted to the spindle upper end 62, as by a pin 81 for front and rear swinging movement and aligned with the plane of folding of the fork members 66 and 67. A knob member 82 is positioned on the threaded shaft 80 and the shaft 80 and knob member 82 are engageable with the forked end portion 79 of the arm 78 to draw the fork members 66 and 67 securely toward the steering spindle 61 whereby the front fork assembly 10 is rigidly connected to the steering assembly 9 for movement about the axis of the spindle 61 and steering.

Preferably, the fork members 66 and 67 are tubular and telescopically receive portions of the handlebar assembly 11 for folding and compact storage of the bicycle structure 1. In the illustrated example, the handlebar assembly 11 is adjustable in height relative to the fork assembly 10 and has upper ends of the fork members 66 and 67 with elongate slots 84 for tightening about the telescoped portions of the handlebar assembly by the drawing action of the knob 82 on the arm 78. The handlebar assembly 11 includes respective handlebar members 86 and 87 which are separated and respectively affixed to posts 88 and 89 depending therefrom. The posts 88 and 89 are telescopically received into the fork members 66 and 67 for controlling the extension thereof and, in an outwardly extended position, FIGS. 1 and 2 are maintained at a selected height by tightening of the knob member 82 toward the arm forked end portion 79. Handlebar members 86 and 87 are joined together in end-to-end relationship by a connecting means including arm members 91 and 92 secured normally to the adjoining ends of the handlebar members 86 and 87 and having mutually engageable portions at one end and a fastening device such as a thumb screw 93 at the remaining end for drawing the arm members 91 and 92 together and thereby affixing the handlebar members 86 and 87 in configuration for use, FIG. 1.

In use, the folding bicycle 1 provides transportation for shopping, work, and the like and offers the ability to be folded, collapsed or otherwise reduced in volume of space required or increased in compactness for storage purposes, as when riding public transportation, storing in an apartment, dormitory room, or the like. The in-use configuration is shown in FIG. 1 whereby the front frame sections 2 and 3, seat structure 7, front fork assembly 10 and handlebar assembly 11 are unfolded and secured for riding. The folding bicycle structure 1 is shown in its most compact relationship in FIG. 3 wherein the front wheel 4 is folded rearwardly and upwardly and received within the front frame section receptacle 27, the handlebar assembly 11 is collapsed and posts 88 and 89 thereof telescoped into the front fork assembly 10, the handlebar members 86 and 87 are separated and moved generally against the rear wheel 5, the seat structure 7 is removed and placed between frame members for storage and the crank arm 47 is folded to move the pedal 48 toward the frame members and out of the way. In its most compact relationship, FIG. 3, the folding bicycle structure 1 occupies little space.

Sequences of folding and unfolding action are shown in FIGS. 2 and 4 whereby in FIG. 2 is shown folding of the front frame section 2 relative to the rear frame section 3 by the hinge means 6 whereby the screw member 34' is loosened to disengage the bracket 32 from the lugs 34. Next, the front wheel 4 is folded rearwardly and upwardly into the receptacle 27 by loosening and unscrewing the knob member 82 enough to permit the shaft 80 to be disconnected from the forked end portion 79 of the arm 78 and swung rearwardly, thereby permitting the front fork assembly 10 to pivot about the axis of the pin 75 whereby the front wheel 4 swings rearwardly first then upwardly into the receptacle 27. Concurrently, the handlebar members 88 and 86 swing downwardly and forwardly and because the knob member 82 has been loosened, clamping or compressive force is no longer applied to the ends of the fork members 66 and 67 and the handlebar posts 88 and 89 can be telescoped inwardly. The thumbscrew 93 is disconnected to separate the arm members 91 and 92 and the handlebar members 86 and 87 rotated until generally in an upright orientation or aligned with the vertical axis of the front wheel 4, FIG. 5. The lever arm 38' is swung downwardly and the upper post 36 of the seat structure 7 is removed from the lower post 37 and the upper post 36 and seat 41 are slid between the front and rear frame sections 2 and 3 to be in compact relationship therewith. Finally, the pivotal means 50 of the crank arm 47 are loosened to turn the pedal 48 inwardly and out of the way.

In the fully folded or collapsed configuration, FIG. 3, the bicycle structure 1 is compact and substantially without projecting members which can catch and interfere with clothing, passersby and the like. Moreover, the rearward and upward folding of the front wheel 4 and receipt thereof into the receptacle 27 aids the formation of a compact folded package or configuration for a rigid frame bicycle suitable for everyday transportation.

It is to be understood that while one form of this invention has been illustrated and described, it is not to be limited to the specific form or arrangement of parts herein described and shown except insofar as such limitations are included in the following claims.

What is claimed and desired to secure by Letters Patent is:

1. A portable, folding bicycle comprising:
   (a) a main frame having front and rear frame sections respectively supporting front and rear wheels and having hinge means interconnecting said frame sections for folding relative to each other into a compact, side-by-side relationship;
   (b) a removable seat structure and means for detachably connecting said seat structure to said main frame;
   (c) rear fork members extending from said rear frame section and rotatably supporting said rear wheel;
   (d) power transmission means extending between said main frame and said rear wheel for effecting rotation thereof;
   (e) said front frame section having a frame member defining a receptacle for receipt of said front wheel, said front frame section having a steering assembly affixed thereto and including upper and lower end portions;
   (f) a front fork assembly foldably mounted to said steering assembly and having spaced, tubular, front fork, members rotatably supporting said front wheel therebetween and connecting hinge means attaching said front fork members to said lower end portion of said steering assembly for rearward and upward folding of said front fork members and said front wheel into said receptacle for compact storage thereof when the bicycle is folded; and
   (g) a handlebar assembly including mutually engageable and separable handlebar portions and posts respectively depending therefrom, said posts being respectively received in said fork members for collapsing of said handlebar assembly partially into said front fork members.

2. The folding bicycle set forth in claim 1 wherein:
   (a) said front frame section includes spaced frame members defining a receptacle therebetween for receipt of said front wheel.

3. The folding bicycle set forth in claim 1 wherein:
   (a) said power transmission means is mounted to the rear frame section and includes a crank assembly extending through a crank hanger secured to said rear frame section, crank arms extending therefrom, a first sprocket mounted to said crank assembly, a second sprocket axially affixed to said rear wheel, a drive chain extending between said first and second sprockets and pedals attached to said crank arms for transmission of driving power to said rear wheel.

4. The folding bicycle set forth in claim 1 wherein:
(a) said seat structure includes an upright, tubular, lower post secured to said frame rear section, an upper post telescopically receivable in said lower post, a saddle seat mounted atop said upper post, and a clamp means selectively mounted about said upper post and removable therewith, said clamp means providing a stop to limit telescoping of said upper post into said lower post and setting the height of said seat relative to said rear frame section.

5. A portable, folding bicycle comprising:
(a) a main frame divided in front and rear frame sections respectively supporting front and rear wheels and having hinge means interconnecting said frame sections for folding relative to each other into a compact, side-by-side relationship;
(b) said rear frame section having a seat structure mounted thereon and including a saddle seat, an upper post connected to and depending from said saddle seat, and a lower post secured to said rear frame section for detachably and telescopically receiving said upper post;
(c) rear fork members extending from said rear frame section and rotatably supporting said rear wheel;
(d) power transmission means connected to said rear frame section and including a crank assembly extending through a crank hanger secured to said rear frame section, crank arms extending therefrom, a first sprocket mounted to said crank assembly, a second sprocket coaxially affixed to said rear wheel and a drive chain extending between said first and second sprockets for transmission of power to said rear wheel;
(e) said front frame section having spaced frame members defining a receptacle sized for receipt of said front wheel, said front frame section having a steering assembly affixed thereto including a housing having a spindle extending therethrough and with upper and lower end portions;
(f) a front fork assembly foldably mounted to said steering assembly and having spaced fork members rotatably supporting said front wheel, upper connecting means for detachable connection of said spaced fork members to the upper end portion of said spindle and lower hinge means connected to the lower end portion of said spindle for rearward folding of said spaced fork members relative to said steering assembly and said front frame section, said front wheel being received, when said fork members are folded, into said receptacle for compact storage thereof; and
(g) a folding handlebar assembly including mutually engageable and separable handlebar portions and posts respectively depending therefrom and telescopically receivable into the spaced fork members of said front fork assembly whereby said posts are receivable into said fork members for compact storage thereof and folding with said front fork assembly.

6. A portable, folding bicycle comprising:
(a) a main frame having front and rear frame sections respectively supporting front and rear wheels and having hinge means interconnecting said frame sections for folding relative to each other into a compact, side-by-side relationship;
(b) a removable seat structure and means for detachably connecting said seat structure to said main frame;
(c) rear fork members extending from said rear frame section and rotatably supporting said rear wheel;
(d) power transmission means extending between said main frame and said rear wheel for effecting rotation thereof;
(e) said front frame section having a frame member defining a receptacle for receipt of said front wheel, said front frame section having a steering assembly affixed thereto and including upper and lower end portions;
(f) a front fork assembly foldably mounted to said steering assembly and having at least one front fork member rotatably supporting said front wheel and connecting hinge means attaching said front fork member to said lower end portion of said steering assembly for rearward and upward folding of said front fork member and said front wheel into said receptacle for compact storage thereof when the bicycle is folded;
(g) a handlebar assembly connected to said front fork member and collapsible relative thereto for compact storage;
(h) said steering assembly including a housing having a spindle extending therethrough and supported for relative rotation therein, said upper and lower end portions being on said spindle;
(i) attachment means removably securing said front fork member to the upper end portion of said spindle whereby said front fork member is rigidly connected to said spindle when said attachment means are engaged therewith and foldable relative to said spindle when said attachment means are disengaged therefrom.

7. The folding bicycle set forth in claim 6 wherein:
(a) said front fork assembly includes spaced fork members having respective first and second end portions and supporting said front wheel therebetween at said first end portions, said attachment means extending between said spaced fork members at said second end portion and thereby connectible to the upper end portion of said spindle.

8. The folding bicycle set forth in claim 7 wherein:
(a) said handlebar assembly includes mutually engageable and separable handlebar portions and posts respectively depending therefrom; and
(b) said spaced fork members are tubular and telescopically receive said posts for collapsing of said handlebar assembly partially into said front fork members.

9. The folding bicycle set forth in claim 8 wherein:
(a) said spindle of said steering assembly has front and rear portions when said front wheel is in an unfolded configuration and oriented generally ahead for forward movement of the bicycle; and
(b) said connecting hinge means are secured to the lower end portion of the spindle at the rear portion thereof and said connecting hinge means includes a pin extending through ears protruding from said spaced front fork members and through a sleeve hanger secured to said spindle whereby said spaced front fork members and said front wheel fold rearwardly and upwardly into said receptacle.

10. In a folding bicycle:
(a) a main frame;
(b) a steering assembly secured to said main frame and having upper and lower end portions;
(c) a fork assembly having a lower portion rotatably supporting a wheel and an upper portion terminating adjacent said steering assembly upper end portion having an intermediate portion, said fork assembly having an intermediate portion foldably mounted to said steering assembly by connecting hinge means attaching said fork assembly to the lower end portion of said steering assembly for movement of said fork assembly lower portion toward said main frame when said bicycle is folded into a storage configuration; and
(d) an attachment means extending between said fork assembly upper portion and said steering assembly upper end portion and including a selectively connectible screw fastener operable to draw said fork assembly upper portion toward said steering assembly upper end portion in rigid, extended, relationship when said bicycle is unfolded into a use configuration.

* * * * *